United States Patent
Gupta et al.

(10) Patent No.: US 10,817,644 B2
(45) Date of Patent: Oct. 27, 2020

(54) CIRCUIT AND METHOD FOR DESIGN OF RF INTEGRATED CIRCUITS FOR PROCESS CONTROL MONITORING

(71) Applicant: GLOBALFOUNDRIES Singapore Pte. Ltd., Singapore (SG)

(72) Inventors: Varun Gupta, Singapore (SG); Wendy Wee Yee Lau, Singapore (SG); Szu Huat Goh, Singapore (SG)

(73) Assignee: GLOBALFOUNDRIES SINGAPORE PTE. LTD., Singapore (SG)

(*) Notice: Subject to any disclaimer, the term of this patent is extended or adjusted under 35 U.S.C. 154(b) by 97 days.

(21) Appl. No.: 16/165,167

(22) Filed: Oct. 19, 2018

(65) Prior Publication Data
US 2020/0125694 A1 Apr. 23, 2020

(51) Int. Cl.
*G06F 11/22* (2006.01)
*G06F 17/50* (2006.01)
*G06F 30/398* (2020.01)
*G05B 19/048* (2006.01)

(52) U.S. Cl.
CPC ......... *G06F 30/398* (2020.01); *G05B 19/048* (2013.01); *G05B 2219/2609* (2013.01)

(58) Field of Classification Search
USPC .................................. 716/136, 113
See application file for complete search history.

(56) References Cited

U.S. PATENT DOCUMENTS

| | | | | |
|---|---|---|---|---|
| 9,083,347 B1* | 7/2015 | Remla | ........ | H03K 21/38 |
| 9,225,378 B2* | 12/2015 | Burgener | ........ | H03K 17/063 |
| 9,620,424 B2* | 4/2017 | Blin | ........ | H01L 21/84 |
| 9,941,849 B1* | 4/2018 | Ayranci | ........ | H04B 1/16 |
| 2002/0138801 A1* | 9/2002 | Wang | ........ | G01R 31/31705 714/729 |
| 2007/0250098 A1* | 10/2007 | Malackowski | ........ | A61B 17/1628 606/170 |
| 2010/0301948 A1* | 12/2010 | Amrutur | ........ | H03F 3/195 330/296 |
| 2014/0256271 A1* | 9/2014 | Kok | ........ | H04B 1/006 455/78 |
| 2014/0333384 A1* | 11/2014 | Gill | ........ | H03F 3/245 330/296 |
| 2014/0375386 A1* | 12/2014 | Rivoirard | ........ | H03F 3/45179 330/253 |

(Continued)

OTHER PUBLICATIONS

Bhushan et al., "Ring Oscillators for CMOS Process Tuning and Variability Control", IEEE, vol. 19, No. 1, Feb. 2006, 9 pages.

*Primary Examiner* — Brian Ngo
(74) *Attorney, Agent, or Firm* — David Cain; Andrew M. Calderon; Roberts Calderon Safran Cole, P.C.

(57) ABSTRACT

The present disclosure relates to testing structures and, more particularly, to a circuit and method for design of RF integrated circuits for process control monitoring. The circuit includes a radio frequency integrated circuit comprising a plurality of active NFET devices and passive devices arranged in a single topography; and a plurality of NFET switches which are configurable to diagnose physical failures of the plurality of active NFET devices and the passive devices by isolating selected ones of the plurality of active NFET devices and the passive devices into different built-in circuit topologies by selectively turning on and off the plurality of active NFET devices and the passive devices.

17 Claims, 5 Drawing Sheets

(56) References Cited

U.S. PATENT DOCUMENTS

| | | | |
|---|---|---|---|
| 2015/0041917 A1* | 2/2015 | Zhu | H01L 27/1203 |
| | | | 257/392 |
| 2017/0338894 A1* | 11/2017 | Voinigescu | H04B 10/6933 |
| 2017/0373647 A1* | 12/2017 | Chang | H03F 1/3205 |
| 2018/0083579 A1* | 3/2018 | Noori | H03F 1/56 |
| 2019/0245497 A1* | 8/2019 | Sanner | H03F 1/0211 |
| 2019/0267945 A1* | 8/2019 | Krishnamurthi | H03D 7/1433 |
| 2019/0267992 A1* | 8/2019 | Jo | H03K 17/693 |
| 2019/0372540 A1* | 12/2019 | Muralidharan | H03G 1/0088 |

* cited by examiner

| Suspect | Ref | 1 | | | | 2 | | | | | | 3 | | | |
|---|---|---|---|---|---|---|---|---|---|---|---|---|---|---|---|
| Lg | ● | ● | | | | ● | ● | ● | | | | ● | ● | ● | |
| Ls | ● | | ● | | | ● | | | ● | ● | | ● | ● | | ● |
| Dgnfet | ● | | | ● | | | ● | | ● | | ● | ● | | ● | ● |
| NFET or other instance | ● | | | | ● | | | ● | | ● | ● | | ● | ● | ● |
| Topology | 6 | 2 | 5 | 8 | 3 | 1 | 4 | 7 | 1 | 7 | 4 | 3 | 2 | 5 | 8 |
| Change (C)/ No Change (NC) *from expected result* | C | NC | NC | NC | C | NC | NC | NC | C | C | C | NC | C | C | C |

No of devices out of spec

FIG. 3A

CIRCUIT AND METHOD FOR DESIGN OF RF INTEGRATED CIRCUITS FOR PROCESS CONTROL MONITORING

FIELD OF THE INVENTION

The present disclosure relates to testing structures and, more particularly, to a circuit and method for the design of RF integrated circuits for process control monitoring.

BACKGROUND

Recent advances in semiconductor manufacturing and design-for-test (DFT) technology have been very effective in producing high-quality integrated circuits. These different tests which include but not exhaustive. e.g., scan, memory BIST (built-in self-test), logic BIST, and boundary-scan, make an integrated circuit more testable and diagnosable while incurring lower test costs compared to ad-hoc functional test techniques. However, as the devices scale downwards, it is becoming difficult to guarantee that the integrated circuit will function properly, especially at high frequencies such as RF integrated circuits, where DFT technology do not exist Different approaches have been used to diagnose physical failures in a RF integrated circuit, in real-time. These processes tend to be tedious, time-consuming and costly. For example, non-intrusive variation aware sensors have been used for measurements. These non-intrusive variation aware sensors include, e.g., dummy current mirrors, capacitors (metal on metal), spiral inductors, etc. Furthermore, it is difficult to isolate true noise and gain performance using these sensors due to the absence of parasitics that exist in a real product circuit.

As another approach, scribe line test structures have been added to a wafer for testing and measurement analysis. These test structures, though, use valuable real estate and can only be used for determining process control for that specific structure. Illustratively, the same structure as used within the product circuit may perform differently due to process variations as a result of the difference in density of the surrounding areas when compared to the scribe line test structure. In addition, scribe line test structures are limited to certain devices. Illustratively, a test structure for a first type of device. e.g., FET, cannot determine any meaningful data for a second type of device, e.g., FET with different channel width, length or implant dose, not to mention to be able to determine the true performance on the devices used in a product circuit.

Lastly, process splits learning can take weeks to months and post silicon RF circuit measurements can take days to weeks to perform. Accordingly, these types of testing do not detect the root cause of process issues fast, consuming valuable time.

SUMMARY

In an aspect of the disclosure, a circuit comprises: a radio frequency integrated circuit comprising a plurality of active NFET devices and passive devices arranged in a single topography; and a plurality of NFET switches which are configurable to diagnose physical failures of the plurality of active NFET devices and the passive devices by isolating selected ones of the plurality of active NFET devices and the passive devices into different built-in circuit topologies by selectively turning on and off the plurality of active NFET devices and the passive devices.

In an aspect of the disclosure, a circuit comprises: a low noise amplifier (LNA) comprising a plurality of active devices and passive devices; and a plurality of NFETs and double gate (DG) NFETs connected to the plurality of active devices and passive devices which are configured to turn on and off the active devices and passive devices to provide built-in different circuit topologies of the LNA. The NFETs are in series connection, the DGFETs are in series connection; and the NFETs are in series connection with a first of the DGFETs and in parallel connection with a second of the DGFETs.

In an aspect of the disclosure, a method comprises: controlling different switches of a circuit to replicate a reference design; performing first bench measurements on the reference design; configuring the circuit into one or more multiple circuit topologies to isolate device(s) of the circuit; performing second bench measurements on the one or more multiple circuit topologies; and determining which device is at issue by comparing the first bench measurements and the second bench measurements.

BRIEF DESCRIPTION OF THE DRAWINGS

The present disclosure is described in the detailed description which follows, in reference to the noted plurality of drawings by way of non-limiting examples of exemplary embodiments of the present disclosure.

FIGS. 3A-3C show a look-up table and respective graphs for a suspect population of components (devices) to isolate and reveal device(s) process issues within the circuit of FIG. 1, in accordance with aspects of the present disclosure.

DETAILED DESCRIPTION

The present disclosure relates to testing structures and, more particularly, to a circuit and method for the design of RF integrated circuits for process control monitoring. More specifically, the present disclosure incorporates multiple circuit topologies in a single RF design to isolate and reveal device(s) process issues. In embodiments, the circuit is composed of RF switches which are configurable into multiple designs to simulate a specific design to obtain specifications for various topologies and isolation of any faults. Advantageously, by implementing the methods and circuit described herein, it is now possible to reduce overall size of multiple topographies for testing and isolating faulty devices by eliminating the need for test structures, with no need to run different process splits to identify the problematic devices and process issues.

In more specific embodiments, the present disclosure describes, with the use of a conventional low noise amplifier (LNA), but not limited thereto, a fast method to characterize multiple RF integrated circuit design topologies to identify possible device-related process concerns. The design includes a LNA with two input ports and one output port, which can be simulated in eight (8) different ways to isolate single and multiple devices to determine a suspected device (e.g., faulty device). In this way, the present disclosure provides process failure debug mechanisms for an RF design. Although the present disclosure is described with reference to an LNA circuit, it should be understood that such device is provided only for illustrative purposes and that other devices can also be used with implementation of the methods described herein. For example, the circuit can be a mixer or other RF circuit.

Figure 1:
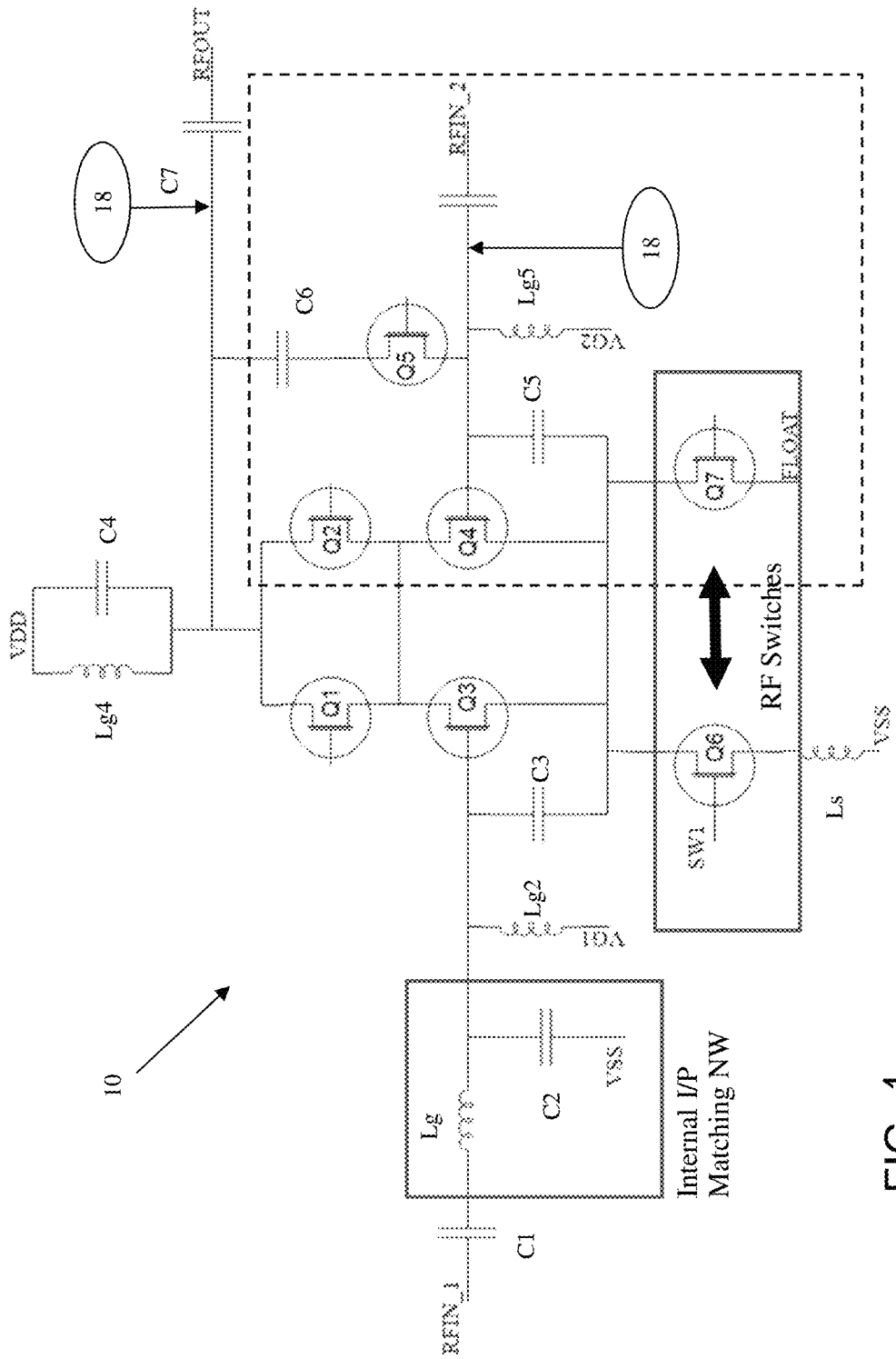
FIG. 1 shows an illustrative circuit diagram in accordance with aspects of the present disclosure.

FIG. 1 shows an illustrative circuit diagram in accordance with aspects of the present disclosure. More specifically, the structure 10 shown in FIG. 1 is a LNA circuit which includes additional switches inserted into the circuit, i.e., FETs Q2, Q4, Q5, Q6 and Q7. In embodiments, the switches (FETs) Q2, Q4, Q5, Q6 and Q7 are strategically placed for the purpose of isolating specific devices of the circuitry, e.g., LNA circuit. For example, the switches (FETs) Q2, Q4, Q5, Q6 and Q7 can be switched on and off to introduce multiple topologies to the LNA circuit 10. In addition to the switches, other FETs and internal matching network(s) can also be provided, e.g., inductor Lg and capacitor C2 (both on a wafer).

In FIG. 1, switches Q2 and Q4 are NFET switches and switches Q5, Q6 and Q7 are double gate (DG) NFETs. NFETs Q2, Q4 and Q7 are in a series connection. In addition, DGNFET Q5 is in a series connection with DGNFET Q7; whereas, NFETs Q2, Q4 are in parallel connection to DGNFET Q5. Moreover, DGNFET Q6 and DGNFET Q7 are in a parallel connection. DGNET Q7 is allowed to float. For example, in embodiments, DGNFET Q7 can be connected to Ls or VSS. As will be recognized by those of ordinary skill in the art, the switches Q2, Q4, Q5, Q6 and Q7 can be switched on and off by respective voltage signals to provide multiple topographies of the LNA circuit in order to isolate particular devices, e.g., FETs Q1, Q3, etc., within the LNA circuit 10.

Still referring to FIG. 1, the LNA circuit 10 can be a cascode design with a two-stage amplifier that consists of a common-emitter stage feeding into a common-base stage. More specifically, the LNA circuit 10 includes a DGNFET Q1 in a series connection with NFET Q3. DGNFET Q1 and NFET Q3 are in a series connection with DGNFET Q6. DGNFET Q1 is in parallel connection to the NFET Q2; whereas, NFET Q3 is in parallel connection to the NFET Q4. In addition, capacitor C1 and inductor Lg are in series with and provide an input to NFET Q3. In addition, RFIN_1 is an input to the NFET Q3.

Figure 2:
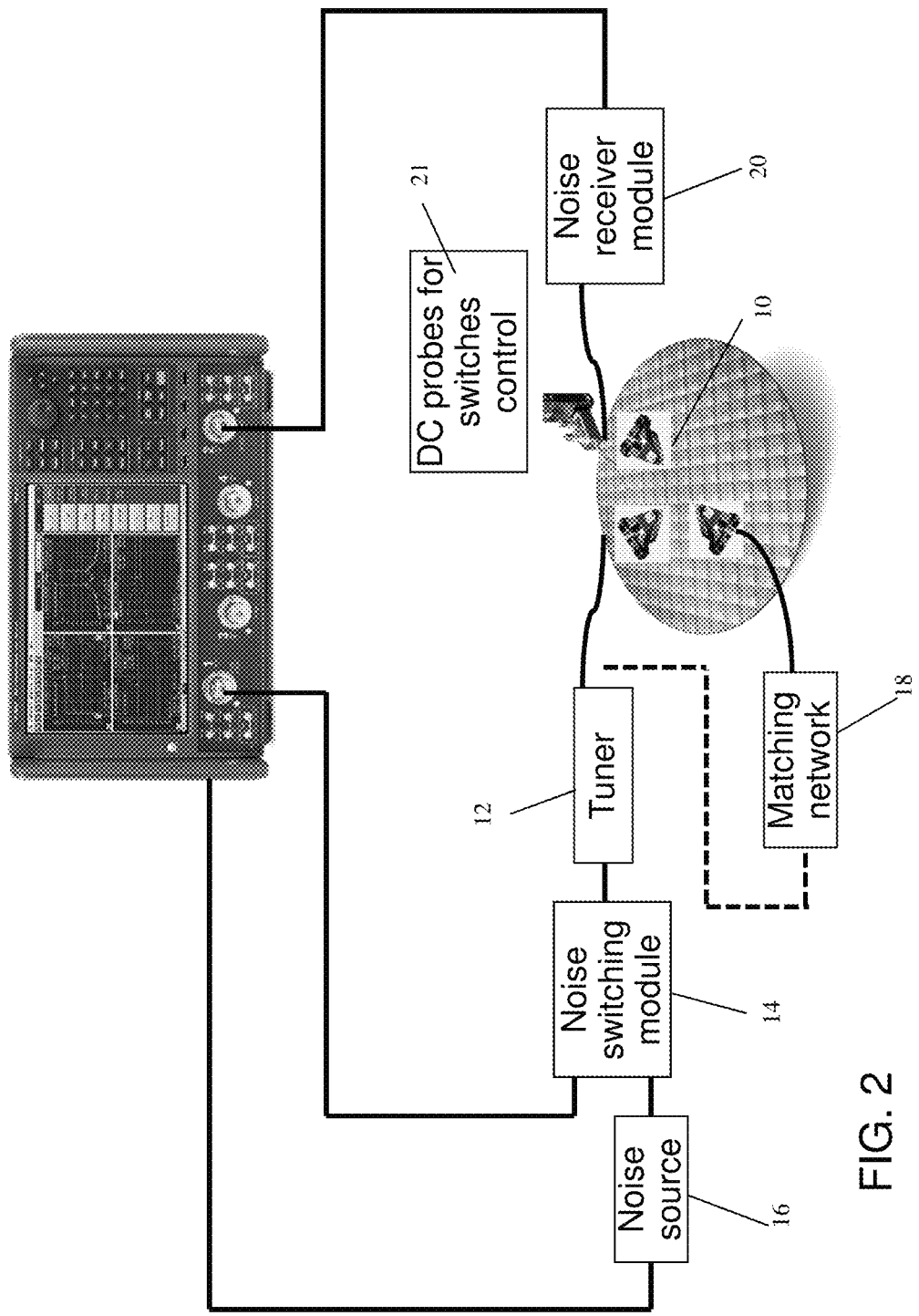
FIG. 2 shows a test set-up in accordance with aspects of the present disclosure.

The circuit 10 further includes inputs VSS, e.g., negative supply terminal, VG1 and VDD. VSS and VG1 are input into NFET Q3 through capacitor C2 and inductor Lg2, respectively. VSS is also input through the inductor Ls into DGNET Q6. The circuit 10 further includes capacitors C3-C7 and inductors Lg4 and Lg5. The output RFOUT and the input RFIN_2 are connected to a matching network 18 as shown in FIG. 2. As thus shown and described, the circuit 10 is a mirror circuit for the purpose of bypass, to activate alternative components as described herein: Q1, Q2; Q3, Q4; Q6, Q7; and Q5 and Lg, C2.

FIG. 2 shows a test set-up in accordance with aspects of the present disclosure. For example, the test set-up includes the following modules (components) connected to the circuit 10: tuner 12; noise switching module 14; noise source 16; matching network 18; and a noise receiver module 20. A DC probe 21 is also provided for switch control. In embodiments, the components of the test set-up can be used to isolate any suspected components of the circuit 10 without the need to change test equipment or use any additional test structures (e.g., dummy devices) within the circuit 10. Instead, by simply switching on and off FETs Q1, Q2, Q3, Q4, Q5, Q6 and Q7, the circuit 10 can have separate topographies which can be tested and compared to expected results using the test set-up of FIG. 2. In this way, it is possible to isolate faulty components of the circuit 10.

Figures 3B, 3C:
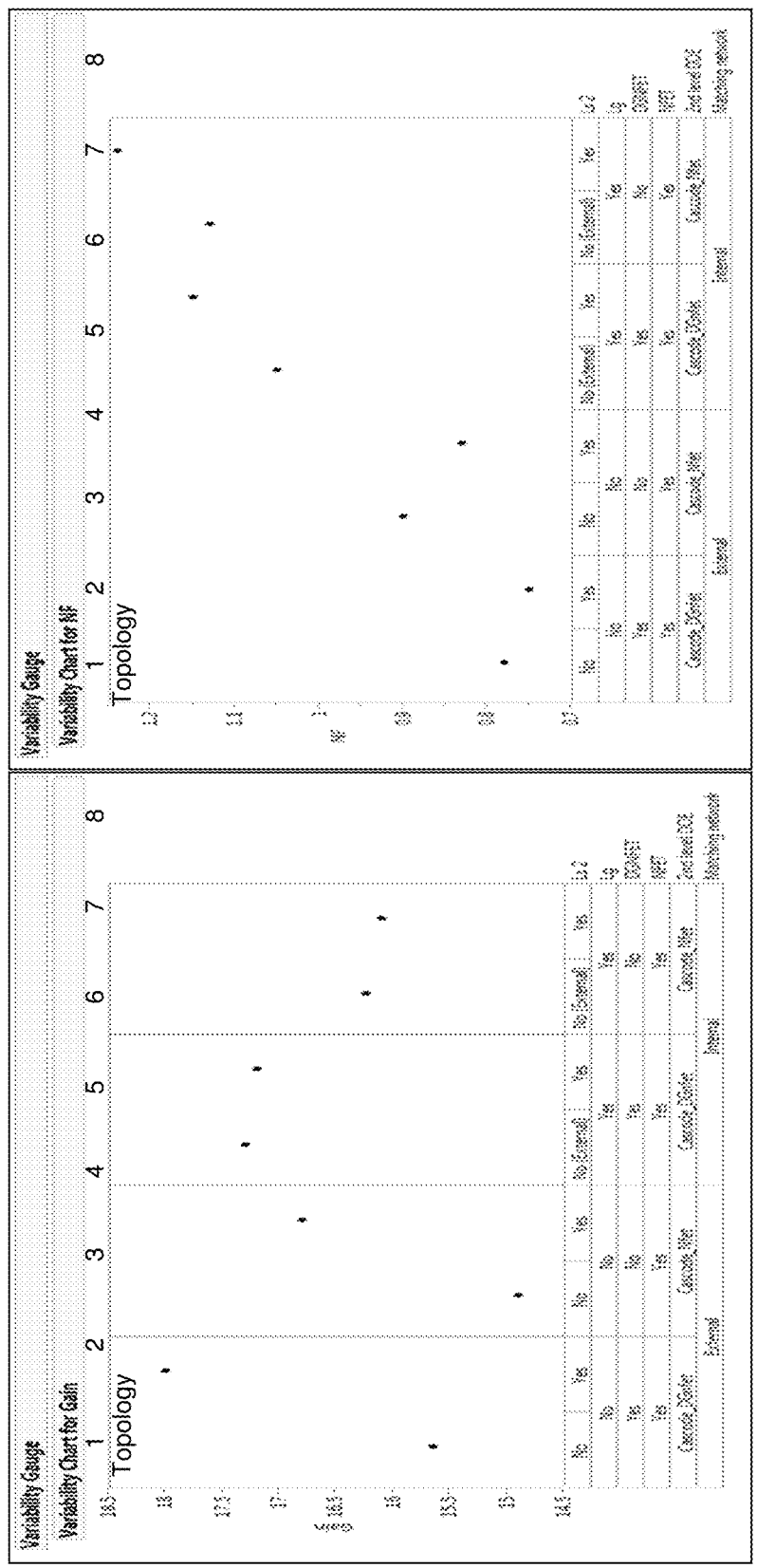

FIGS. 3A-3C show a look-up table and respective graphs for a suspect population of components (devices) to isolate and reveal device(s) process issues within the circuit 10 of FIG. 1, in accordance with aspects of the present disclosure. By way of general example, the circuit 10 of FIG. 1 can include the following operating conditions: (i) placing FETS Q1, Q3 and Q6 in an operating condition, then (ii) placing FETS Q2, Q3 and Q6 in an operating condition to isolate FET Q1. By comparing the operating conditions (i) and (ii) it is possible to determine if there is any performance issues with FET Q1 or the other components which, in turn, can be isolated in steps by changing the topologies and further measurements. More specifically, the isolation of a suspected device is accomplished by determining whether the expected performance of operating condition (ii) matches with an expected performance. By way of another example, by switching on and off the FETs Q6 and Q7, it is possible to isolate other active or passive components of the circuit 10.

More specifically, FIG. 3A is a table showing different devices (components of circuit 10) that are suspected of being out of specification and the respective topologies to reveal them. FIG. 3B is representative of a chart showing the actual performance (simulated or measured) variability in gain based on different topographies selected from the table shown in FIG. 3A and FIG. 3C is representative of a chart showing actual performance (simulated or measured) variability in NF (noise) based on different topographies selected from the table shown in FIG. 3A.

In this example, FIG. 3A shows the following components of circuit 10 which may be out of specification: inductor (Lg), inductor (Ls), DGNFET (e.g., Q1); and NFET (e.g., Q3) or other instances. The table of FIG. 3A further shows several topographies that can be used to determine device performance, e.g., topographies 1-8 shown in FIGS. 3B and 3C, and the expected results based on the number of devices which may be out of specification, e.g., one (1) device, two (2) devices or three (3) devices.

By way of more specific example and referring to FIG. 3A, devices Ls, Lg, DGNFET and NFET are tested using topography 6 (and test set-up of FIG. 2). The test includes performing RF bench measurements. As shown in FIGS. 3B and 3C, topography 6 includes devices Lg, Ls, DGNFET and NFET in the operational stage (on). In this example, a certain gain and noise is recorded and if this does not match with the expected performance, it is now possible using the added elements of FIG. 1 to isolate any of the circuit devices to determine which component may be out of specification.

Now, assuming that one or more devices are out of specification, the tester can refer to any of the topographies shown under the columns of FIG. 3A, representative of the number of devices which may be out of specification. Assuming a single device may be out specification, the tester can use different topographies 2, 5, 8 or 3, depending on which respective devices Lg, Ls, DGNFET or NFET, are expected of being out of specification.

For example, taking the instance of inductor Lg possibly being out of specification, the tester would perform RF bench measurements using topography 2 shown in FIGS. 3B and 3C. This topography would include the inductor Ls being in an operational state (e.g., on), inductor Lg being off and both DGNFET and NFET both being on. In this topography if the measured outcome is the same as the expected result as shown in FIG. 3A, Lg is the suspect because it is excluded in this topology. Assuming, though, the tester believes the NFET is out of specification, the tester would implement topography 3 shown in the table of FIG. 3A for performing RF bench measurements. In this topography, as shown in FIGS. 3B and 3C, the inductor Ls, inductor Lg and DGNFET would be in an operational state (e.g., on), and NFET would be off.

As should be understood by those of ordinary skill in the art, this same process can be used for two suspected devices and three suspected devices, and which are believed to be out specification. In each of these different configurations, the switches (FETs) Q2, Q4, Q5, Q6 and Q7 can be switched on and off to introduce the multiple topologies shown in FIGS. 3B and 3C. For example, in topology 8, the Cascode DGNFET is the suspect because it is excluded in this topology. If the measured outcome shows no change (NC) from expected measurement, Lg, Ls, NFETs or the other components are suspected. As another example, in topology 2, if the measured outcome if different from expected, Lg is suspected since it is excluded and the circuit is driven by external matching network (with external ideal Lg as part of the external network). In this example, if the measured outcome has no change (NC) from the expected measurement, hence Ls, DGNFET, NFET or the other components are suspected.

Figure 4:
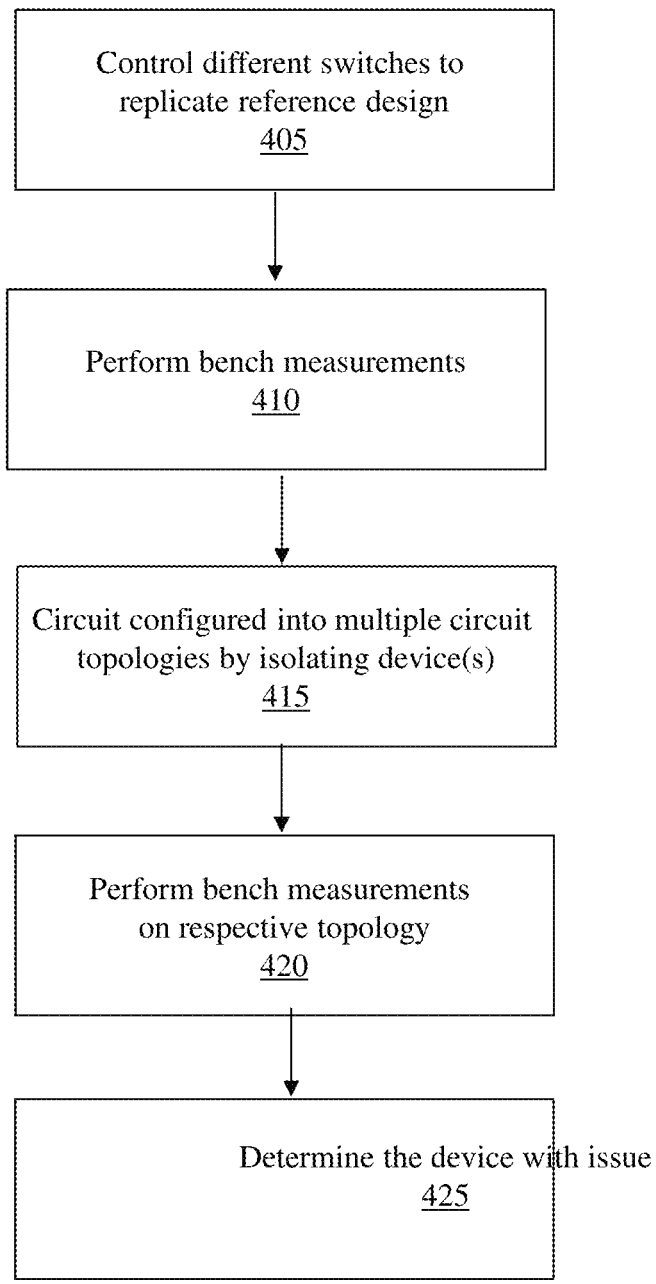
FIG. 4 shows a flowchart representing a method of determining an issue with a device in, e.g., the circuit of FIG. 1.

FIG. 4 shows a flowchart representing a method in accordance with aspects of the present disclosure. After strategic placement of different FET types, RF switches and/or internal matching network(s) for the purpose of device(s) isolation, at step 405, the method includes controlling different switches to replicate a reference design. This can be done by turning off the different inserted circuitry as described herein. At step 410, the method includes performing bench measurements, e.g., RF bench measurements, of the reference design. The bench measurements can be conducted by the test set-up of FIG. 2. At step 415, the method includes configuring the circuit into multiple circuit topologies by isolating device(s). This configuration can be done by controlling, e.g., turning on and off, different arrangements of the inserted circuitry which, in turn, will turn on and off respective devices of the circuitry under test, for the different topographies. At step 420, the method includes performing additional RF bench measurements on the respective topology (provided at step 415) and, at step 425, the method determining which device in the circuit may have an issue based on the comparison of the measurement tests.

The circuit of the present disclosure can be manufactured in a number of ways using a number of different tools. In general, though, the methodologies and tools are used to form structures with dimensions in the micrometer and nanometer scale. The methodologies, i.e., technologies, employed to manufacture the circuit of the present disclosure have been adopted from integrated circuit (IC) technology. For example, the structures are built on wafers and are realized in films of material patterned by photolithographic processes on the top of a wafer. In particular, the fabrication of the circuit uses three basic building blocks: (i) deposition of thin films of material on a substrate, (ii) applying a patterned mask on top of the films by photolithographic imaging, and (iii) etching the films selectively to the mask.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A circuit comprising:
   a radio frequency integrated circuit comprising a plurality of active NFET devices and passive devices arranged in a single topography; and
   a plurality of NFET switches which are configurable to diagnose physical failures of the plurality of active NFET devices and the passive devices by isolating selected ones of the plurality of active NFET devices and the passive devices into different built-in circuit topologies by selectively turning on and off the plurality of active NFET devices and the passive devices.

2. The circuit of claim 1, wherein the plurality of NFET switches are NFETS and gate (DG) NFETs.

3. The circuit of claim 2, wherein:
   the NFETs are in series connection;
   the DGFETs are in series connection; and
   the NFETs are in series connection with a first of the DGFETs and in parallel connection with a second of the DGFETs.

4. The circuit of claim 2, wherein the plurality of active devices include a DGNFET and the switches are configurable to isolate the DGNFET by turning it on and off.

5. The circuit of claim 4, wherein the active devices further include a NFET in series with the DGNFET.

6. The circuit of claim 5, wherein the switches are configurable to isolate the NFET of the active devices by turning it on and off.

7. The circuit of claim 6, wherein the switches are NFETs.

8. The circuit of claim 7, wherein the switches are in a series connection.

9. The circuit of claim 8, wherein the switches are in a parallel connection with the NFET and the DGNFET of the circuit.

10. The circuit of claim 1, wherein the active devices and the passive devices are arranged to be a low noise amplifier.

11. The circuit of claim 1, wherein the active devices and the passive devices are configurable into eight (8) different topographies by switching on and off different combinations of the switches.

12. A circuit comprising:
    a low noise amplifier (LNA) comprising a plurality of active devices and passive devices; and a plurality of NFETs and double gate (DG) NFETs connected to the plurality of active devices and passive devices which are configured to turn on and off the active devices and passive devices to provide built-in different circuit topologies of the LNA, wherein:

the NFETs are in series connection;

the DGFETs are in series connection; and the NFETs are in series connection with a first of the DGFETs and in parallel connection with a second of the DGFETs.

13. The circuit of claim 12, wherein the active devices include a DGNFET and a NFET in series, and the switches are configurable to isolate either the DGNFET or the NFET of the active devices.

14. The circuit of claim 13, wherein the passive devices include inductors and capacitors.

15. The circuit of claim 12, wherein the active devices and the passive devices are configurable into eight (8) different topographies by switching on and off different combinations of the switches.

16. The circuit of claim 12, wherein the active devices and the passive devices are configurable into eight (8) different topographies by switching on and off different combinations of the switches.

17. The circuit of claim 12, wherein the active devices include a NFET in series with the DGNFET and the plurality of NFETs and double gate (DG) NFETs are configurable to isolate the NFET of the active devices by turning it on and off.

* * * * *